United States Patent [19]

Heitkamp et al.

[11] 4,277,345

[45] Jul. 7, 1981

[54] METHOD FOR THE RECOVERY OF URANIUM DISSOLVED IN SEA WATER

[75] Inventors: Dieter Heitkamp; Klaus Wagener, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 100,191

[22] Filed: Dec. 4, 1979

Related U.S. Application Data

[63] Continuation of Ser. No. 887,297, Mar. 16, 1978, abandoned.

[30] Foreign Application Priority Data

Mar. 17, 1977 [DE] Fed. Rep. of Germany ....... 2711587

[51] Int. Cl.$^3$ ......................... C22B 60/02; C02F 1/42

[52] U.S. Cl. .................................... 210/679; 210/682; 423/6

[58] Field of Search ............... 210/30 R, 36, 24, 38 B, 210/38 C, 32, 39, 40, 59, 502, 503–508; 423/6; 252/426

[56] References Cited

U.S. PATENT DOCUMENTS

| | | | |
|---|---|---|---|
| 3,721,533 | 3/1973 | Riedel | 210/38 C |
| 3,728,257 | 4/1973 | Fuxelius | 210/36 |
| 3,872,002 | 3/1975 | Musgrove | 210/59 |
| 3,885,069 | 5/1975 | Roberts et al. | 210/36 |
| 3,900,422 | 8/1975 | Terajima et al. | 210/38 B |
| 3,994,830 | 11/1976 | Terajima et al. | 210/38 B |
| 4,013,585 | 3/1977 | Terajima et al. | 210/38 B |
| 4,039,445 | 8/1977 | Heide et al. | 210/38 C |

FOREIGN PATENT DOCUMENTS

| | | | |
|---|---|---|---|
| 49-30943 | 8/1974 | Japan | 210/38 B |
| 51-45455 | 4/1976 | Japan | 210/38 B |
| 51-67217 | 6/1976 | Japan | 423/6 |

*Primary Examiner*—Benoit Castel
*Attorney, Agent, or Firm*—Becker & Becker, Inc.

[57] ABSTRACT

A method for recovering uranium ions from sea water utilizing an adsorbent matrix. The materials contained in the matrix comprise biologically recent humic acids. Matter which serves as carrier material for the humic acids is present in the dry state up to 99% by weight.

1 Claim, No Drawings

METHOD FOR THE RECOVERY OF URANIUM DISSOLVED IN SEA WATER

This is a continuation application of parent application Ser. No. 887,297 filed Mar. 16, 1978, now abandoned.

The present invention relates to a method for recovering uranium ions from sea water utilizing an adsorbent matrix.

Numerous attempts have been made to recover the heavy metals contained in sea water, since a practically unlimited supply of heavy metals is contained in sea water. Insofar as the heretofore known methods for recovering heavy metals, especially uranium, are based on the principle of counter current extraction, chemical precipitation, and ion flotation in sea water, it is necessary to use chemical materials. This has the drawback that, in general, large amounts of chemicals must be used, with the further drawback that the costs for the use of the respective material are relatively great. Furthermore, the pollution caused by the use of these chemicals can, if at all, only be prevented at great cost.

German Patent 24 41 479 does disclose a matrix, comprising cultivatable sea weed mutants, with which it is possible to recover uranium from sea water without having to use chemical materials which can pollute the environment. However, in order, with this known matrix, to achieve a daily production which is sufficiently high for an economical operation, immense cultures would be required in order to cultivate the necessary quantity of sea weed. This, however, can only be brought about at great expense.

It is therefore an object of the present invention to provide a method for recovering uranium ions from sea water utilizing an adsorbent matrix which can be made at relatively low cost and is simply and economically usable for concentrating heavy metals contained in sea water without polluting the environment, simultaneously, however, has a high effectiveness and is available in quantitites which are sufficient for an economical operation.

The adsorbent matrix used in the present invention is characterized primarily in that the materials which are contained in the matrix comprise biologically recent humic acids. Matter which serves as carrier material for the humic acids is present in the dry state up to 99% by weight. Biologically recent humic acids refers to humic acids which were recovered from decay (humifizierungs) products which were found as recently as several thousand years ago.

Humic acids are only slightly soluble in water. Therefore, especially since they are also biologically resistant to bacterial build-up, they are usable in sea water for a long time. The distribution coefficient of humic acids, defined as the ratio of the heavy metal concentration in the adsorbent material to the heavy metal concentration in the sea water at an equilibrium condition, is therefore unexpectedly high, despite the high pH value of the sea water.

According to a particularly advantageous form of the adsorbent matrix used in the present invention, the substance which comprises the humic acids and the carrier material is natural black peat, the degree of decomposition of which (i.e. a measure of the relative proportion of decay products to the total substance) is about 35 to 55%. The distribution coefficient of black peat for uranium in sea water is of the order of magnitude of $10^4$. In this connection, not only uranium, but also other heavy metals, such as vanadium and molybdenum, accumulate on an adsorbent matrix of peat. The recovery of these metals as byproducts from the recovery of uranium from sea water increases the economy of the method of the present invention and is therefore a cost reducing factor. Since the remaining components of the peat are also just as resistant to bacterial build-up in the sea water as are the humic acids, this form of the matrix pursuant to the present invention is also usable for a long period of time for extracting heavy metals from sea water. For this reason, a repeated reuse can be made of the adsorbent matrix of the present invention after the extraction or elutriation of the heavy metals concentrated on the matrix. As a result, and due to the ready availability of high value peat, this form of the matrix is usable to an extent which in principle makes possible a daily production of one metric ton of uranium, which is considered an economical recovery. The quantity of peat required for this purpose, if the adsorbent matrix is reused at least ten times, is less than about $5\times10^3$ metric tons a day.

Pursuant to the present invention, an expedient form of the adsorbent matrix, which comprises black peat, consists in that the black peat exists as granular material having granule sizes in the range of 0.1 to 10 mm. After the natural black peat is dried, this range of granule size is produced by crushing the dried peat.

To produce this form of the adsorbent matrix, natural, black, moist peat is dried by withdrawing therefrom the greatest portion of the water content on large surfaces located out of doors. The dried peat sods, so-called fuel peat, still have a residual water content of about 28–30%. These sods are then reduced in size to fine-grained granular material. Prior to using the granules as adsorbent, the granules are moistened with water, as a result of which the numerous fine channels and pores of the peat granules are filled with water, causing the granules to swell. This process can be accelerated by generating an underpressure of about 20 Torr, allowing the air to leave the channels and pores.

A further, very expedient form of the adsorbent matrix, which comprises black peat, consists in that the black peat exists as a layer adhering to lattices or netting of material, such as jute or nylon, which is sufficiently stable in sea water. The layer is formed by placing natural black peat upon the lattices. The stability of the material is sufficient if it remains stable, when moistened, for the time provided for its use, which time can be about one month. During the manufacture of this form of adsorbent matrix, natural, oozy, black peat, at sufficient pressure, is placed on both sides of the lattices, which have a mesh size of a few mm, so that the peat mass penetrates the lattices. During subsequent drying, the peat layers mat on both sides of the lattices, through the mesh, and into one another. Thereafter, the peat layers have a stable form, not only during renewed moistening with water, but also in a strong current of water.

Another, very advantageous form of the matrix used in the present invention consists in providing, as a carrier material, a material which is stable in sea water and has a large surface for bonding. The humic acids are placed on this material. In this connection, the material which is provided as synthetic carrier material for the humic acids should be resistant in sea water and should make a reuse of the adsorbent matrix possible. Such material is advantageously activated carbon having granule sizes in the range of 0.1 to 10 mm. These activated carbon granules could, for example, be made of fuel peat. Lignite having the same granule size range could also be used as such material. Although activated carbon has the larger bonding surface, the use of lignite as carrier material for the humic acids may be preferable for cost reasons. It may also be expedient if the material provided as synthetic carrier material comprises fibrous natural substances, such as jute, cotton, coco fiber or coir, etc. In this way, the adsorbent matrix can be in the form of a coil in which the fibers are loosely united. A preferred form of the matrix, however, consists in that the fibrous natural substances are in the form of a net-like web.

Depending upon the form of the matrix used in the present invention, different methods of use are provided. Thus it may be advantageous, for concentrating out of the sea water heavy metals which are dissolved in the sea water, to envelop the matrix in a casing or outer cover which is impermeable for the matrix but permeable for sea water, and to impart to a casing in the sea water a movement relative to the sea water. This is the case if the adsorbent matrix is granular or is a type of coil made of fibrous material. The matrix is then expediently encased in lattices of suitable mesh size; the lattices can, for example, comprise nylon fibers. To concentrate the heavy metals, a plurality of filter bodies, which are formed in this manner and preferably have an oblong shape, and which are arranged parallel to one another and in succession, are placed in the ocean current in such a way that the current of the sea water is actually directed along the filter body yet guarantees an adequate exchange of sea water through the lattices.

In the same manner, but without the necessity of a casing for the matrix, the matrix is used for concentrating the heavy metals out of the sea water when the matrix comprises an adsorbent layer on carrier lattices. The current, in this connection, is directed along the lattices, which are likewise arranged parallel to one another and often in succession in such a way that the different parallel lattice positions are offset with regard to one another. In this way, the ocean current, after having passed the first position, is split by the next position, resulting in a good water intermixture at relatively low current resistance. The distance of the lattices from one another, and the number of positions, are determined in such a way that at current speeds of up to 5 m/s, the desired heavy metal depletion in sea water is still achieved.

Since an acceleration of the sea water by means of pumps is not favorable energywise, it is expedient to generate the necessary relative movement between the matrix of, whatever form, and the sea water by hanging the lattices on a moving ship. If, for example, daily production is based on one t uranium, then, with the removal of 8 $\mu$g uranium from 1 liter sea water, about $10^9$ $m^3$ sea water must be put through the matrix daily. If the matrix is pulled through the water at a speed of 20 km/h, then the total cross section of the matrix can be reduced to about 2000 $m^2$. The use of a ship offers the additional advantage that the matrix can be used in ocean regions which have a lower biological production. The danger of a growth of the matrix is thereby largely avoided.

A further, very expedient use of the matrix in the form of granular material for concentration of heavy metals out of sea water, consists in that the matrix is agitated in a tank containing sea water. The agitation is effected by the sea water flowing into the tank. The agitation is expediently achieved with the aid of suitable guiding devices which are provided in the tank. A loss of granular material is prevented by arranging fine-meshed lattices on the exit of the tank. The desired loading of the matrix with heavy metals from the sea water is achieved very quickly with this method as a result of the agitation.

EXAMPLE 1

One gram of air dried black peat was ground and filtered, and a granular material having a granule size distribution in the range of 10–70 $\mu$m in the dry state was obtained. After being moistened with water, the granular material, which had swelled to a granule size of over 100 $\mu$m, was added to 10 liters natural sea water at 20° C. and a pH of 8.3, which sea water also contained 3.3 $\mu$g uranium and 2 $\mu$g vanadium per liter of sea water. The granular material was stirred for four hours. After the subsequent separation of the granular material from the sea water, the amount of uranium adsorbed in the peat was determined to be 18 $\mu$g, and the vanadium was determined to be 16 $\mu$g. The uranium content of the depleted sea water was still 1.5 $\mu$g per liter. That corresponds to a distribution coefficient for uranium of $1.2\times10^4$, relative to the dry weight of the peat. The vanadium content of the depleted sea water was still 0.3 $\mu$g per liter, corresponding to a distribution coefficient for vanadium of $5.3\times10^4$.

The uranium and vanadium which were adsorbed on the peat were completely elutriated by stirring the granular peat material, which was loaded with the uranium and vanadium, in 200 $cm^3$ of 1% hydrochloric acid (pH of 0.6). For this purpose, about 4 $cm^3$ of the hydrogen ion content of this acid was used per gram of peat. Concentration and subsequent elutriation was repeated thirty times in the described manner with the same peat. Even after using the peat as adsorbent thirty times, no decrease of the distribution coefficient was discernible for uranium and vanadium.

EXAMPLE 2

On the high seas near the North Sea island of Sylt, 54 liters sea water at 7° C. were pumped through a fluidized adsorbent bed at a speed of 1 liter per minute. 28 g black peat having the granule distribution described in Example 1 were constantly agitated in this adsorbent bed, which comprised a 2.7 liter column closed off at one end with nylon gauze having a pore size of 100 $\mu$m.

Prior to the depletion, the sea water contained 3.3 $\mu$g uranium per liter. Of the 178 $\mu$g which was contained in the 54 liters of sea water prior to the experiment, 137 $\mu$g, that is, 77% of the entire quantity of the uranium, was bonded on the adsorbent. In so doing, the first three liters of sea water pumped through the adsorbent bed were depleted to 0.1 $\mu$g uranium per liter, and the remaining quantity of sea water was depleted to 0.4 $\mu$g uranium per liter.

EXAMPLE 3

Natural oozy black peat, under pressure, was placed on both sides of the jute lattices (mesh size of about 2 mm) and nylon lattices (mesh size 1 mm), which lattices were contained in plastic frames, in such a way that the peat pulp penetrated all of the meshes. After the subsequent drying in air, and the interlacing connected therewith, the layers mutually stabilized on both sides of the lattices by means of the numerous connections existing throughout the meshes. Peat having a total dry weight of 3 g was, in this manner, very adhesively placed on every 1 g jute and nylon lattice. After remoistening with water, the peat layers again swell up somewhat on the lattices. In one stability test, these matrices were subjected to sea water for four days, and the sea water flowed along the matrices with a relative speed of about 2 m/sec. The peat layers maintained a constant shape and did not loosen or separate from the lattices.

EXAMPLE 4

40 g natural moist black peat which was taken from the high peat bog (Hochmoor) near Gross Hesepe in Emsland, West Germany, and had a water content of about 80%, was agitated in 120 $cm^3$ of 0.5 normal solution of caustic soda for about 15 hours and was then centrifuged. 32% hydrochloric acid was added to the centrifuged-off solution until a pH value of 1 was obtained. The humic acids portion which precipitated out was centrifuged off and was neutrally washed with distilled water. The dry weight of the thus recovered humic acids was 1.2 g.

This quantity of humic acids, without prior air drying, was stirred for two hours with 10 liters natural sea water which was at 20° C. and had a pH of 8.3 and a uranium content of 3.3 $\mu g$ per liter. After subsequent separation of the humic acids from the sea water, the following values were measured: the sea water was depleted to 0.6 $\mu g$ uranium per liter; the humic acids contained 25 $\mu g$ uranium; and the distribution coefficient was $3.7\times10^4$, relative to the dry weight of the humic acids. The uranium adsorbed on the humic acids was completely elutriated with diluted hydrochloric acid in the same manner as described in Example 1. Concentration and elutriation was repeated eight times on the same matrix without affecting the distribution coefficient.

EXAMPLE 5

40 grams of natural moist black peat having the same consistency as in Example 4 was again stirred in 120 $cm^3$ of 0.5 normal solution of caustic soda for about 15 hours, and was then centrifuged. The centrifuged-off solution was first of all supplied with 3.6 g fine-grained activated carbon (having an average granule size of 10 $\mu m$), and was then adjusted or standardized to a pH of 1 with 32% hydrochloric acid. The humic acid portion, which precipitated out, bonded on the activated carbon, which acted as a carrier. The dry weight of the thus produced humic acid-activated carbon-matrix was 4.8 g, in which connection the humic acids to activated carbon weight ratio was 1:3.

As in Example 4, this matrix was stirred with 10 liters of natural sea water for two hours. In this way, the uranium content of the sea water was reduced from 3.4 $\mu g$ per liter to 0.8 $\mu g$ per liter if, prior to contact with the sea water, the matrix was dried with air, and was reduced to 0.6 $\mu g$ per liter if the preceding air drying was omitted. The distribution coefficients corresponding to the respective quantities of dry weight of humic acids was $2.6\times10^4$ and $3.7\times10^4$.

The uranium adsorbed on this matrix, as was the case in Example 1, was completely elutriated with 1% hydrochloric acid. Concentration and elutriation was repeated eight times on the same matrix without affecting the distribution coefficient.

EXAMPLE 6

In the manner described in Example 4, 1.2 g humic acids were isolated from 40 g of natural moist black peat. The freshly precipitated humic acids were left in a neutral suspension and were brought into contact with 8 g jute lattice for several days until the suspension was dried into the jute in a uniform distribution. Thereafter, the matrix was again moistened with sea water, as a result of which about 5% of the humic acids which were placed on the jute again dissolved. The rest of the matrix remained essentially insoluble in water; the further loss through dissolving of the humic acids which were in daily contact with flowing sea water remained under 1%.

The present invention is, of course, in no way limited to the specific disclosures of the examples, but also encompasses any modifications within the scope of the appended claims.

What we claim is:

1. A method of concentrating uranium ions naturally occurring in sea water having a pH of 8.3, the method comprising the steps of:

suspending in the sea water an adsorbent matrix of humic acids and carrier material, said matrix being in the form of natural, biologically recent, chemically untreated black peat granules ranging in diameter from 0.1 mm to 10 mm said matrix being contained by a structure which admits sea water but retains the granules, the matrix having a degree of decomposition in the range of thirty-five percent to fifty-five percent, and the carrier material comprising up to ninety-nine percent of the matrix by weight;

providing relative motion between the matrix and sea water to adsorb the uranium ions onto the matrix and to thereby concentrate the uranium ions for subsequent removal.

* * * * *